(12) United States Patent  
Swope et al.

(10) Patent No.: US 8,131,215 B2
(45) Date of Patent: Mar. 6, 2012

(54) METHOD AND APPARATUS FOR DETERMINING LOCATION OF A COMMUNICATION DEVICE

(75) Inventors: Charles B. Swope, Coral Springs, FL (US); Armando J. Gonzalez, Miami, FL (US); Charles R. Ruelke, Margate, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 581 days.

(21) Appl. No.: 12/335,031

(22) Filed: Dec. 15, 2008

(65) Prior Publication Data

US 2010/0151886 A1 Jun. 17, 2010

(51) Int. Cl.
*H04B 7/00* (2006.01)

(52) U.S. Cl. .................... 455/41.2; 455/457; 455/456.1; 455/456.6

(58) Field of Classification Search .................. 455/41.2, 455/457, 456.3, 456.1, 456.6; 702/158, 107; 340/870.05, 870.01; 235/472.01, 462.45
See application file for complete search history.

(56) References Cited

U.S. PATENT DOCUMENTS

| | | | | |
|---|---|---|---|---|
| 4,276,549 A * | 6/1981 | Tomasi | ............................ | 342/87 |
| 4,823,295 A | 4/1989 | Mader | | |
| 5,550,549 A | 8/1996 | Procter | | |
| 5,687,196 A | 11/1997 | Proctor | | |
| 5,719,584 A | 2/1998 | Otto | | |
| 5,859,613 A | 1/1999 | Otto | | |
| 5,870,047 A | 2/1999 | Piesinger | | |
| 5,959,568 A * | 9/1999 | Woolley | ......................... | 342/42 |
| 5,960,047 A | 9/1999 | Proctor | | |
| 5,982,808 A | 11/1999 | Otto | | |
| 6,038,271 A | 3/2000 | Olaker | | |
| 6,067,017 A | 5/2000 | Stewart | | |
| 6,324,392 B1 | 11/2001 | Holt | | |
| 6,674,396 B2 | 1/2004 | Richards et al. | | |
| 6,820,031 B1 | 11/2004 | Hayakawa | | |
| 6,973,316 B1 * | 12/2005 | Hayakawa | ................. | 455/456.1 |
| 7,570,962 B2 * | 8/2009 | Chou | ........................ | 455/456.5 |
| 2003/0128163 A1 | 7/2003 | Mizugaki et al. | | |
| 2007/0111737 A1 | 5/2007 | Swope | | |

FOREIGN PATENT DOCUMENTS

JP 2001033543 A 2/2001
KR 1020080050981 A 6/2008

OTHER PUBLICATIONS

PCT International Search Report Dated Jul. 13, 2010.

* cited by examiner

*Primary Examiner* — Jean B Jeanglaude
(74) *Attorney, Agent, or Firm* — Valerie M. Davis; Daniel R. Bestor

(57) ABSTRACT

A reference device determines its distance from a communication device by first using a training process to determine a calibrated time delay for the communication device when the communication device is at a known distance from the reference device. The calibrated time delay is a steady state internal processing delay for the communication device. Subsequently, when the reference device is at an unknown distance from the communication device, the reference device determines the unknown distance using the previously determined calibrated time delay along with a measured signal travel time at the unknown distance.

20 Claims, 8 Drawing Sheets

METHOD AND APPARATUS FOR DETERMINING LOCATION OF A COMMUNICATION DEVICE

FIELD OF THE DISCLOSURE

The present disclosure relates generally to wireless communications and more particularly to a method and apparatus for determining the location of a communication device.

BACKGROUND

Communication devices such as portable two-way radios vastly improve the effectiveness of police, fire, and military personnel in a public or military emergency situation. Often the first responders at an emergency site communicate with subsequent responders to direct them to respond effectively in the emergency situation where it is often critical to locate the responders and other entities such as sensors, portable communication devices, and the like. A variety of solutions are available for determining the location of a responder and various entities, which can be segmented into three basic groups: outdoor, indoor, and indoor/outdoor solutions. Outdoor location solutions typically provide two-dimensional location information in outdoor areas such as streets, parks, stadiums, markets, and the like. Typically, the outdoor solutions include Global Positioning System (GPS) based location determination solutions. Indoor solutions typically provide three-dimensional location information in a more localized area such as in buildings, warehouses, and the like. Generally, indoor solutions require dense installation of field-deployable infrastructure and have stringent location accuracy requirements. Indoor/outdoor solutions provide wide area location information for multi-building campuses. Conventionally, an indoor/outdoor location solution requires a combination of outdoor tracking technologies and installation of indoor tracking support infrastructure.

There are several inherent shortcomings in the existing location determination technologies that inhibit their usage in an indoor/outdoor solution for determining location. Generally, a GPS based solution does not work reliably in dense urban areas. Further, a GPS based solution cannot be used as an indoor solution for determining location. Generally, network overlay solutions provide better outdoor coverage at the expense of accuracy. Dedicated systems usually provide both coverage depth and accuracy, but at a high infrastructure cost.

Accordingly, there is a need for a method and apparatus for accurately determining the location of a communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
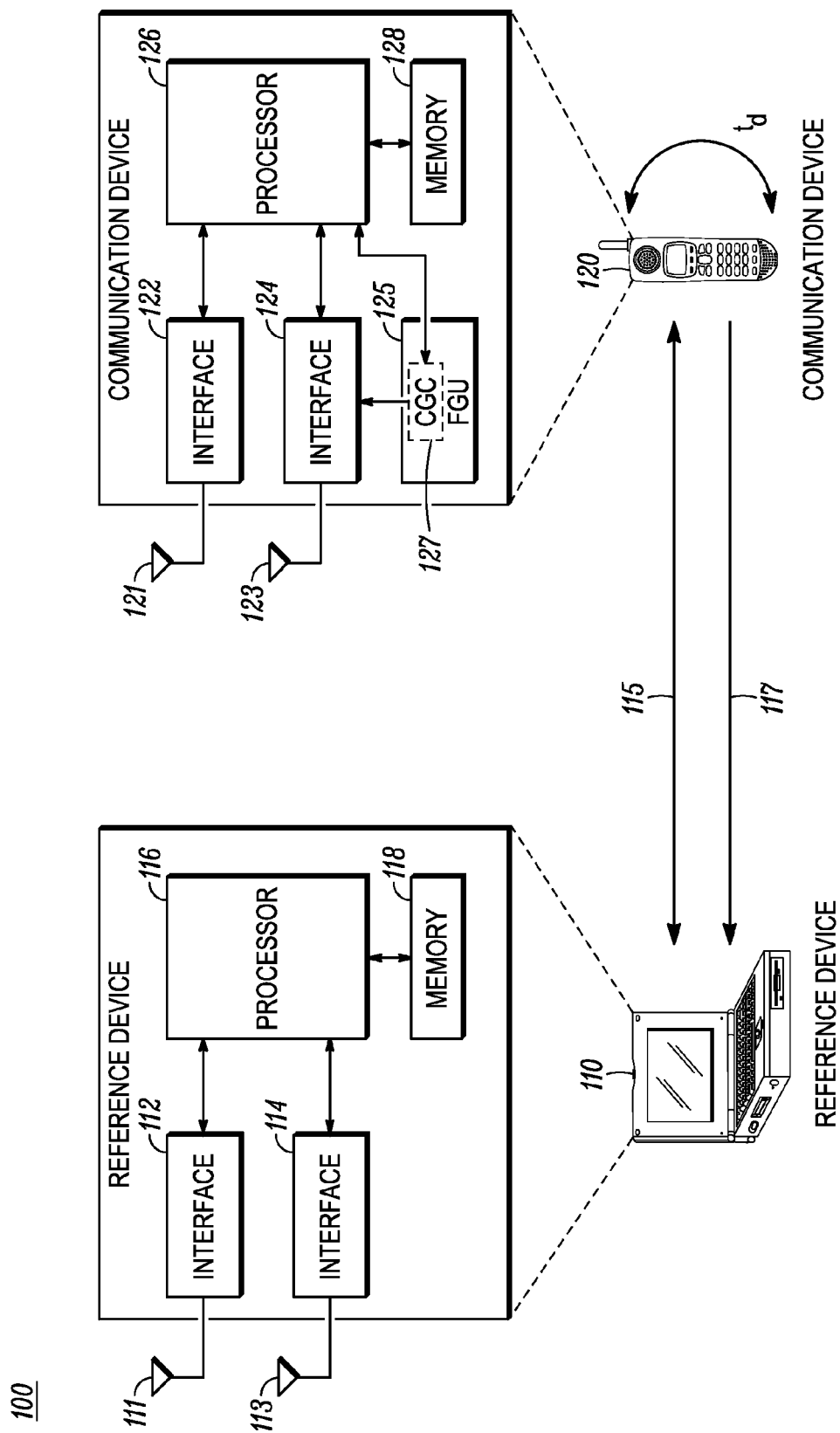
FIG. 1 is a block diagram that shows a reference device communicating with a communication device to determine the location of the communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the described embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the described embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments, a reference device determines its distance from a communication device by first using a training process to determine a calibrated time delay for the communication device when the communication device is at a (first) known distance from the reference device. Subsequently, when the communication device is at a (second) unknown distance, the reference device determines the unknown distance using the previously determined calibrated time delay. More particularly, the reference device measures a first time delay corresponding to the known distance and uses the training process to determine the calibrated time delay based on the first time delay, wherein the calibrated time delay comprises a steady state internal processing delay ($t_d$) for the communication device. The reference device, further, measures a second time delay corresponding to the unknown distance, calculates a delay difference between the second time delay and the calibrated time delay, and translates the delay difference into the unknown distance to the communication device.

In accordance with some embodiments, the training process to determine the calibrated time delay comprises the reference device: sending an initial request to the communication device on a first data channel (e.g., a narrowband channel) to initiate an inbound location pulse sequence; and responsive to the request, receiving at least one pulse of the inbound location pulse sequence on a second data channel (e.g., a wideband channel), wherein the first time delay is the time difference between sending the initial request and responsively receiving the at least one pulse. The reference device determines an intermediate time delay based on the first time delay, wherein the intermediate time delay comprises an intermediate internal processing delay for the communication device. The steps of sending the request; receiving an inbound location pulse or sequence of pulses; determining the time difference between sending the request and receiving the inbound location pulse sequence, and determining the intermediate time delay is iterated until the steady state internal processing delay for the communication device is achieved, which corresponds to the calibrated time delay. Each internal processing delay for the communication device comprises a delay between when the communication device receives a request from the reference device to transmit an inbound location pulse sequence and the communication device transmitting the inbound location pulse sequence.

Further in accordance with some embodiments, the reference device sends the intermediate time delay(s) to the communication device to enable it to manage its processes to stabilize its internal processing delay. The reference device may further send the calibrated time delay to the communication device for storing until it is needed to calculate a subsequent unknown distance.

Referring now to the drawings, and in particular FIG. 1, a block diagram illustrating a reference device 110 communicating with a communication device 120 to determine the location of the communication device 120 in accordance with some embodiments is shown at 100. The reference device 110 determines a distance of the communication device 120 by measuring a time delay after training the communication device 120. In the described embodiments, the reference device 110 and the communication device 120 operate in accordance with Project 25 (P25 or APCO25) standard protocols, which are a suite of standards for digital radio communications that are produced through the joint efforts of the Association of Public Safety Communications Officials International (APCO), the National Association of State Telecommunications Directors (NASTD), selected Federal Agencies and the National Communications System (NCS), and standardized under the Telecommunications Industry Association (TIA). However, the teachings described herein are in no way limited to this system implementation. Those skilled in the art will recognize and appreciate that the specifics of this example are merely illustrative of some embodiments and that the teachings set forth herein are applicable in a variety of settings. As such, other alternate implementations with the devices using different protocols are contemplated and are within the scope of the various teachings described herein. Also, the reference device 110 can be associated with more than one communication device to determine locations of a plurality of communication devices.

As used herein, the term reference device includes, but is not limited to, equipment commonly referred to as access points, access terminals, base stations, incident command stations, and any other device capable of interfacing with a communication device in a wireless environment. In accordance with some embodiments, the reference device 110 can be portable, such as in the case of the laptop computer 110 shown in FIG. 1. As such, the reference device 110 can be installed in a vehicle such as a fire truck. As used herein, the term communication device includes, but is not limited to, equipment commonly referred to as mobile devices, access terminals, two-way radios, portable radios, and any other device capable of operating in a wireless environment. Typically, the communication device 120 is portable and it can be carried by a responder to an emergency situation.

As shown in FIG. 1, the reference device 110 comprises an interface 112, an interface 114, a processor 116, a memory 118, and antennas 111 and 113; and the communication device 120 comprises an interface 122, and interface 124, a processor 126, a memory 128, antennas 121 and 123 and a frequency generation unit (FGU) 125 that optionally includes Chirp Generation Circuitry (CGC) 127 to generate a sequence of wideband "chirp" signals used as location pulses. The interfaces are also referred to herein as "radio" interfaces. The reference device 110 and the communication device 120 are also equipped with a transceiver, i.e., transmitter and receiver apparatus (not shown), coupled to the interfaces and antenna, which include FGUs, and is further equipped with any additional components, such as one or more timers coupled to the processor, as needed for a commercial embodiment.

The transceiver, memory and processors can have any suitable physical implementation and are topologically coupled depending on the particular device implementation. These components are further operatively coupled and can be adapted, arranged, configured, and designed to perform methods in accordance with the teachings herein, for instance, as illustratively described by reference to FIG. 1 through FIG. 8. For example, memories 118 and 128 can store various time delays including the calibrated time delay used to determine the distance to the communication device 120 from the reference device 110.

In accordance with this illustrative embodiment, the devices 110 and 120 include two interfaces and two antennas for communicating using two different channels, wherein the channels are the physical communication resources over which information is sent between the devices 110 and 120 and can comprise wired links or wireless links (as in the present case). For wireless channels, the corresponding physical resource is an allocation of radio spectrum that is partitioned into radio frequency (RF) carriers that are modulated by a media or control stream.

More particularly, interface 112 and antenna 111 of the reference device 120 communicate with the interface 122 and antenna 121 of the communication device 120 on a narrowband channel 115, which in this example is an APCO25 data channel but can be any type of wireless channel having any suitable bandwidth. For the purposes of this application, a narrowband channel is defined as any wireless channel having channel spacing equal to or less than 500 kHz. In accordance with the teachings herein, the reference device 110 uses the radio interface 112 and antenna 111 to transmit and receive control information related to an inbound location pulse sequence.

The interface 114 and the antenna 113 of the reference device 110 communicate with the interface 124 and antenna 123 of communication device 120 on a channel 117. In accordance with the teachings herein, the reference device 110 receives a sequence of pulses from the communication device 120 on the channel 117, wherein the sequence of pulses comprises an inbound location pulse sequence. In the described embodiments, the channel 117 is a wideband channel, but it can be any type of wireless channel having any suitable bandwidth. For the purposes of this application, a wideband band channel is defined as a wireless channel having a frequency span equal to or greater than 5 MHz. In one embodiment, a location pulse signal from the communication device 120 sweeps over a frequency range of 50 MHz when communicated on channel 117 and is, therefore, said to have a bandwidth (BW) of 50 MHz.

Antennas 111, 113, 121 and 123 may be omni-directional, sectored, MIMO (Multiple In, Multiple Out, a technology that allows antennae to process numerous incoming and outgoing signals simultaneously), or a smart antenna array. In accordance with one embodiment, the antennas 111, 121, and 123 are each an Omni-directional antenna, while the antenna 113 is a narrow beam phase array or scanning antenna. However, the reference device and communication device antenna structures need not be limited in this fashion. In accordance with alternate embodiments, a single antenna may also be used for both communicating on the narrowband channel and receiving on the wideband channel. If a single antenna topology is employed, an antenna switch may also be incorporated at the junction of the antenna and the two interfaces, as is well known in the art. Moreover, the location of any communication device can be estimated by determining the range and azimuth information of the communication device. For example, several antennas can be located around an incident scene and a scanning antenna can be utilized to provide azimuth (or angle) information. Alternatively, Phased Arrays can be used to get three-dimensional information about the communication device. Range measurements will be described in greater detailed in a subsequent section of this text.

As mentioned earlier, the communication device 120 further comprises circuitry that generates the location pulses sent to and used by the reference device 110 during the training process to determine the calibrated time delay and further used by the reference device 110 after the training process to determine its distance from the communication device. It should be realized that the scope of the teachings herein are not limited by the particular type of circuitry used to generate the location pulses. However, one illustrative example of such circuitry is shown in FIG. 1 as the CGC 127, which is included in the FGU 125 that is coupled to the interface 124 and the processor 126.

Generally, the FGU 125 (also referred to in the art as a frequency synthesizer) generates the appropriate frequency signals needed to transmit and receive narrowband signals on channel 115, wherein the narrowband signals include voice or other media sent between two communication devices. Some embodiments of a FGU include a Voltage Controlled Oscillator (VCO), a synthesizer loop filter, a reference frequency oscillator, and a synthesizer Integrated Circuit (IC) (that includes at least one charge pump, a phase detector, and a frequency divider) controlled by a microprocessor, wherein the microprocessor can be integrated into the processor 126 or implemented as a separate processing device. Other embodiments of the FGU include a phase locked loop (PLL), a frequency divider, a phase detector, a charge pump, a delay line (with multiple delay elements), and a tap selection network controlled by a microprocessor.

Frequency selection in a frequency synthesizer may be accomplished via a control signal that may be either analog or digital. When the control signal (as a voltage source) is applied to a VCO (or is changed), the VCO moves from a first frequency to the programmed frequency for normal radio operations. However, the frequency change is not immediate and, in fact, occurs over a short period of time creating what is commonly referred to as chirp. As used herein, a chirp signal is a varying RF signal with a predefined, wideband frequency swept response of relatively short time duration (e.g., 22 micro-seconds). The CGC 127 sweeps the RF frequency over a wide range of frequencies (e.g., 50 MHz) to generate a wideband chirp (location) signal that the communication device sends to the reference device 110 over the wideband channel 117.

In one FGU embodiment, the CGC 127 steers the VCO to generate the chirp signal. In another embodiment, the CGC 127 controls the tap selection network to select taps from the delay line to generate the chirp signal. The chirp signal, in one embodiment, has a frequency ramp that slopes in one direction (i.e., a slope with a single polarity, e.g. with a positive slope +K or a negative slope −K). In an alternative embodiment, the chirp signal has two parts, wherein the first part of the chirp signal is ramped with a slope having a first polarity, and the second part of the chirp signal is ramped with a slope having the opposite polarity. Correspondingly (although not shown in FIG. 1), the reference device 110 includes counterpart circuitry in its receiver apparatus to properly receive the chirp signal. When the chirp signal has one part that slopes in one direction, the reference device 110 comprises an APCO modem and a chirp receiver incorporating an up-ramp (+K) or a down-ramp (−K) correlator filter matched to the location pulse characteristics (e.g., slope of the chirp signal). In the alternative embodiment, where the chirp signal has two parts, the chirp receiver of the reference device 110 includes a splitter for splitting the received chirp signal, up-ramp (+K) and down-ramp (−K) matched correlator filters, and a microprocessor for controlling the up-ramp and down-ramp matched correlator filters.

The process for training the communication device 120 so as to enable the reference device to determine the calibrated time delay, and the processes by which the reference device 110 determines a distance to the communication device 120, are next described in reference to FIGS. 2 through 8. It will be appreciated that the methods described in accordance with the teachings herein include functionality that may be performed in hardware, firmware, software or a combination thereof and may further be performed at a single device or a combination of devices. For example, the reference device 110 can include two independent devices coupled to each other. Also, one or more steps of the methods can be performed at supporting hardware units external to the reference device 110.

Figure 2:
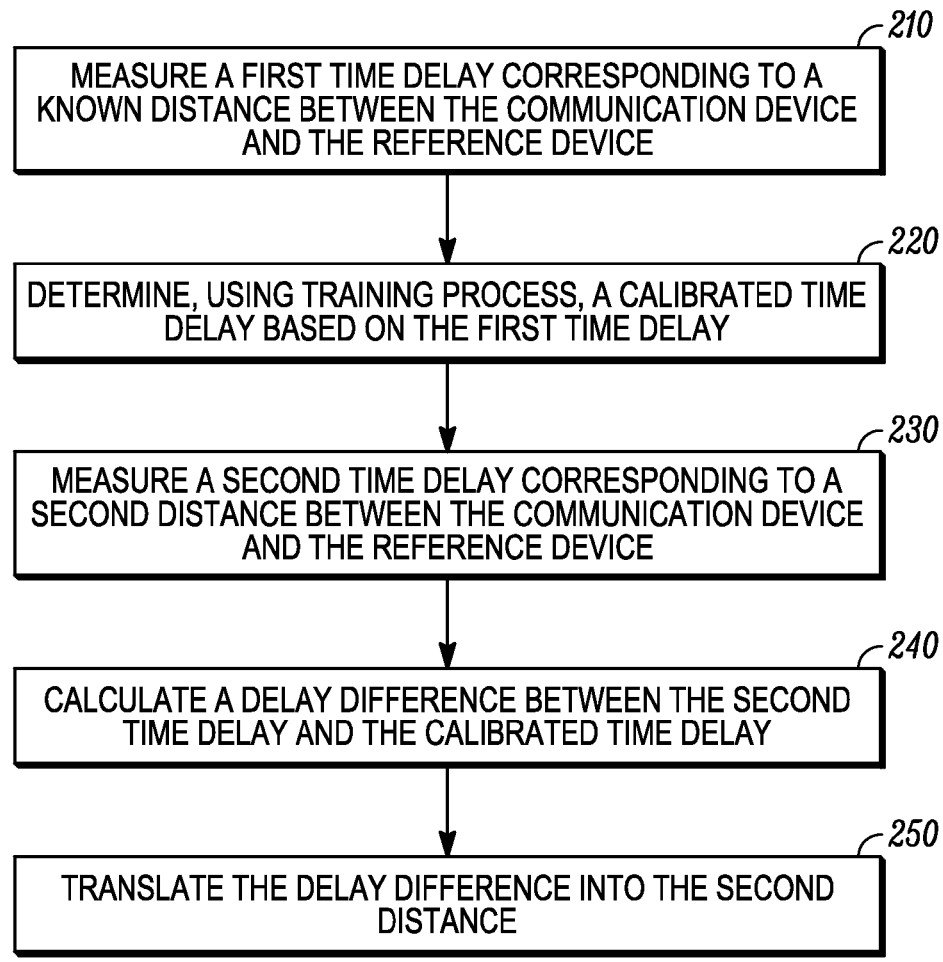
FIG. 2 is a flowchart of a method of determining a distance of a communication device from a reference device in accordance with some embodiments.

Turning now to FIG. 2, a flow diagram is shown illustrating a method 200 of a reference device (e.g., reference device 110) determining a distance to a communication device (e.g., communication device 120), in accordance with some embodiments. In accordance with method 200, the reference device measures (210) a first time delay corresponding to a known distance between the communication device and the reference device. The first time delay is the sum of the time taken by radio waves to travel from the reference device to the communication device, the processing delay at communication device, and the time taken by radio waves to travel from the communication device to the reference device. If the communication device is stationary, the only variable component in the first time delay is the processing delay at the communication device, which is subsequently managed during the training process to stabilize the internal processing delays. More particularly, during the training process, the reference device determines (220) a calibrated time delay based on the first time delay, wherein the calibrated time delay comprises a steady state internal processing delay for the communication device.

At a time subsequent to the training process, the reference device measures (230) a second time delay corresponding to a second (unknown) distance between the communication device and the reference device. In one illustrative embodiment, measuring the second time delay comprises: sending a request to the communication device on a narrowband channel such as an APCO25 data channel to transmit an inbound location chirp signal; receiving the inbound location chirp signal on a wideband channel; and determining a time difference between sending the request and receiving the inbound location chirp signal, wherein the time difference is the second time delay.

The reference device calculates (240) a delay difference between the second time delay and the calibrated time delay (determined during the calibration process). More particularly, the reference device subtracts the calibrated time delay from the second time delay to eliminate the effect of the processing delay at the communication device in the distance calculation algorithm. The reference device translates (250) the delay difference into the second distance. In one embodiment, the translation includes multiplying the delay difference by the speed of light and subtracting out known delays associated with correlator processing within the reference device as will be described in greater detail in subsequent text. Since the calibrated time delay comprises a steady state internal processing delay of the communication device, a fairly accurate estimate of the distance can be determined using method 200. The remaining figures illustrate the teachings herein in the context of an APCO system implementation, with both reference device 110 (which is part of an incident command server (IC)) and the communication device 120 including therein an APCO modem that operates in accordance with the APCO25 protocols.

Figure 6:
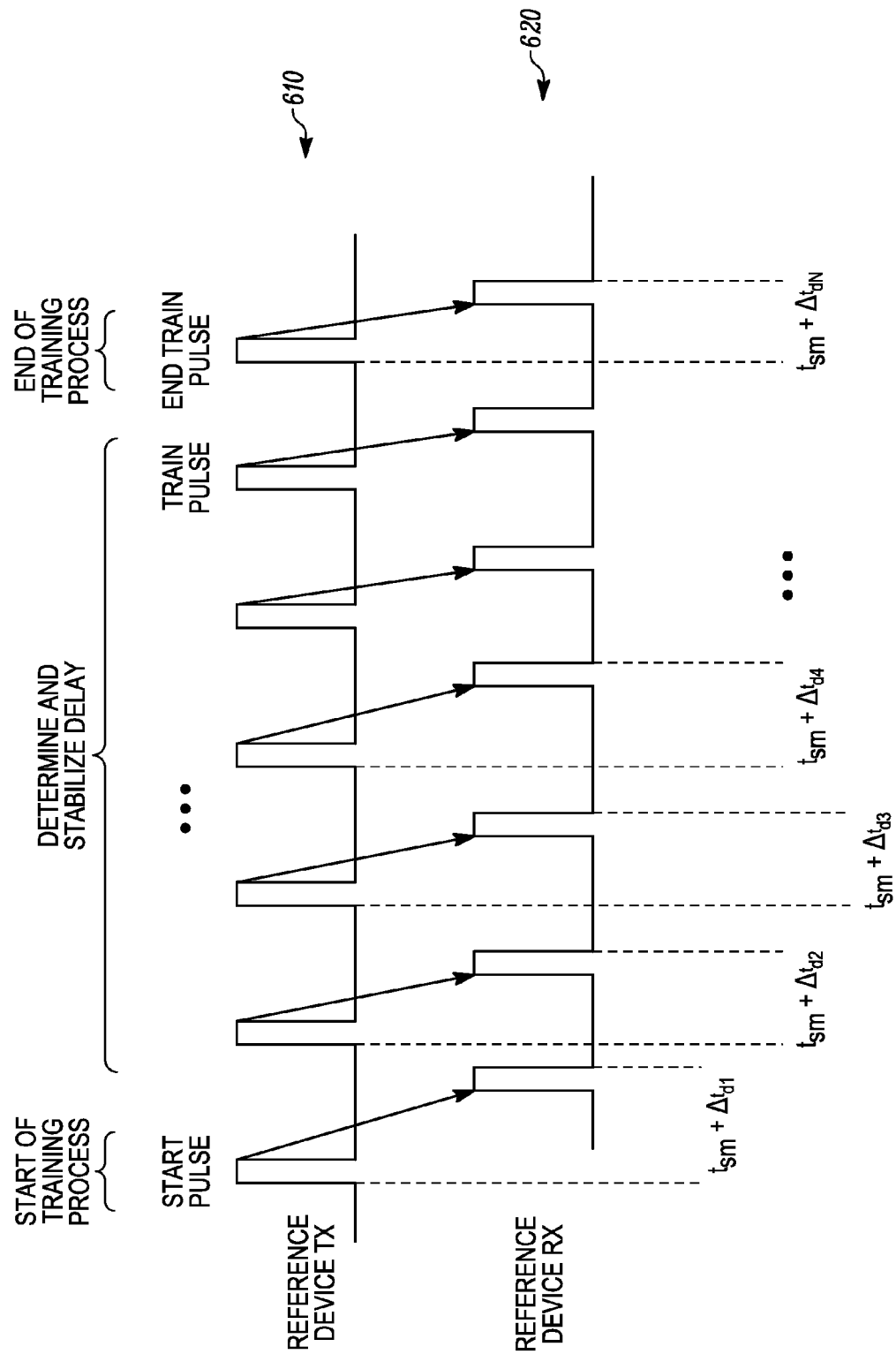
FIG. 6 shows a training pulse sequence for training a communication device in accordance with some embodiments.
Figure 7:
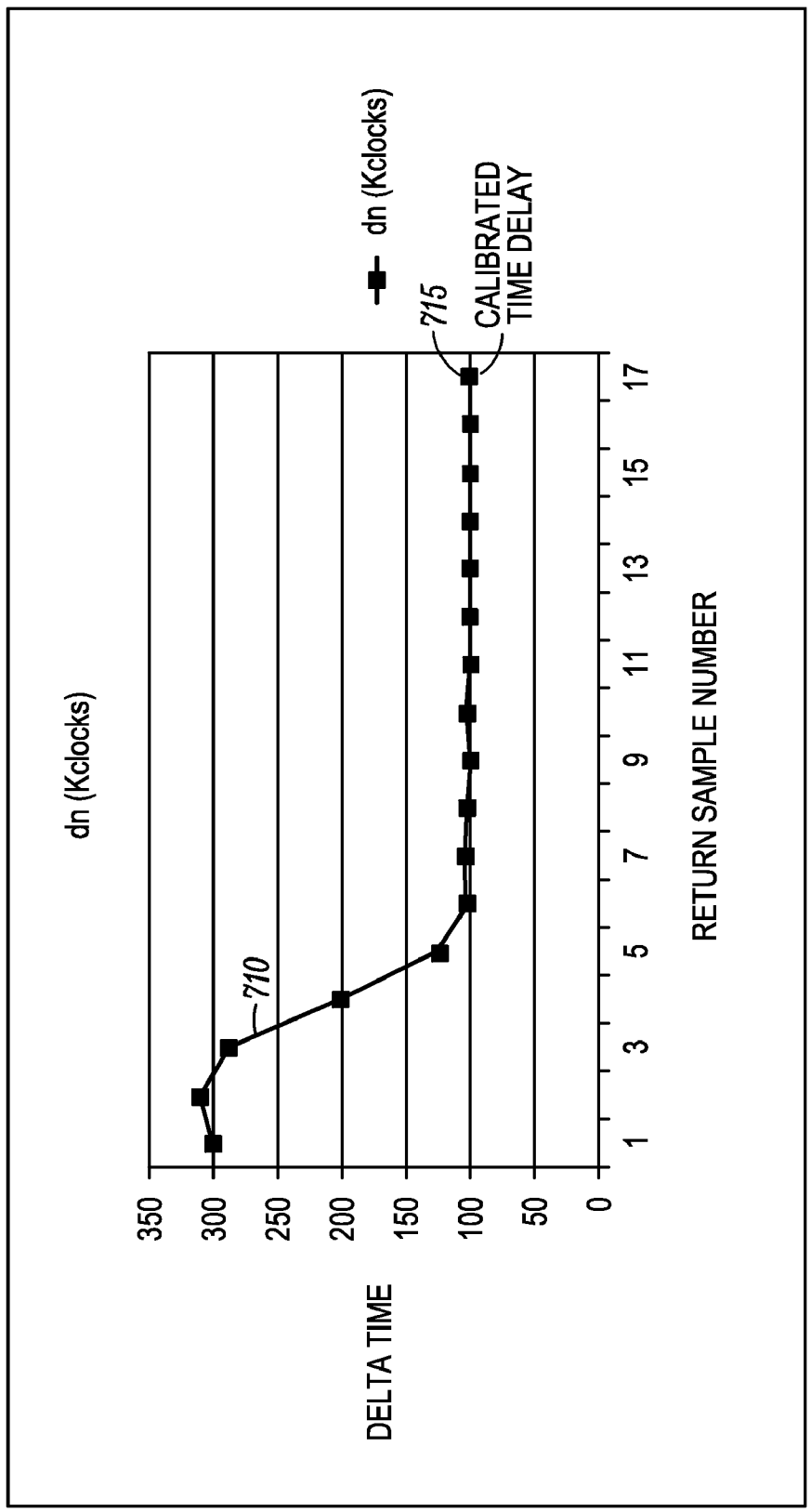
FIG. 7 is a diagram which illustrates a converged radio response time for a communication device in accordance with some embodiments.
Figure 8:
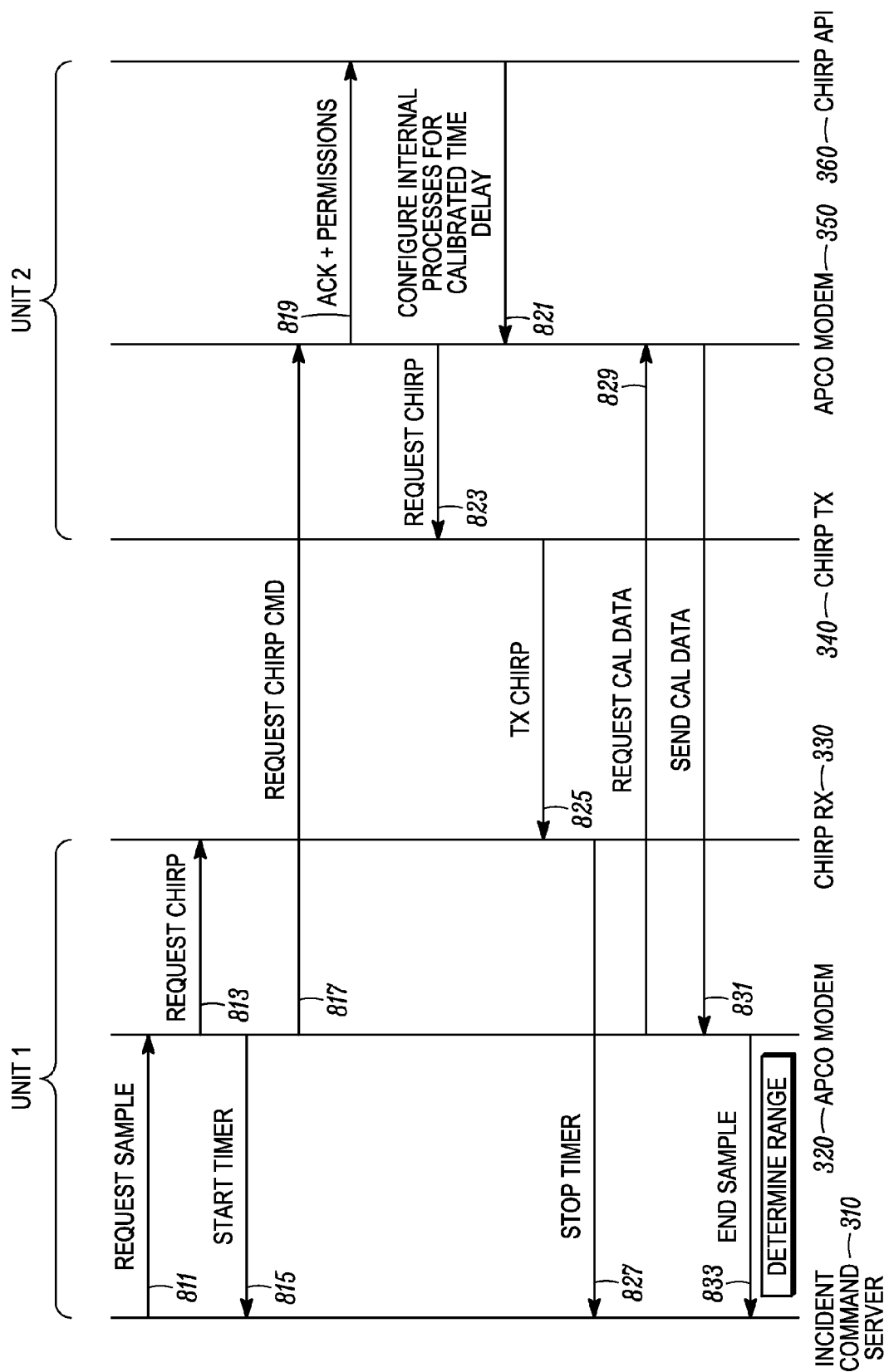
FIG. 8 is a signaling diagram that illustrates determining a distance of a communication device from a reference device in accordance with some embodiments.

More particularly, FIGS. 3-7 illustrate the training process to generate the calibrated time delay, and FIG. 8 illustrates the reference device using the calibrated time delay to determine the unknown distance of the communication device. FIGS. 3-5 and 8 show two units: unit 1 (the reference device) and unit 2 (the communication device). In addition, a line indicates a command event that is initiated, and the arrow terminating a line points from the command originator to the peripheral as indicated along the X axis.

As shown in the drawings, unit 1 comprises an incident command server 310, an APCO modem 320, and a chirp receiver (RX) 330 operatively coupled for performing the functionality shown in FIGS. 3-5 and 8. The IC server and the APCO modem can be integrated into the same device or may be included in separate devices. For example, the incident command server can be a laptop computer, and the APCO modem and chirp RX (with the implementation of the chirp RX depending on the type of chirp signals generated by the communication device as discussed above) can be included in a radio that is communicatively coupled to the laptop computer via a wired or wireless interface. Unit 2 comprises a chirp transmitter (TX) 340 (that transmits chirp signals), an APCO modem 350 and a chirp application programming interface (API) 360 operatively coupled for performing the functionality shown in FIGS. 3-5 and 8.

In general, the training process includes: sending an initial request (e.g., a request chirp command) to the communication device on a first data channel (e.g., an APCO25 narrowband channel) to initiate an inbound location pulse sequence; receiving, on a second data channel (e.g., a wideband channel) in response to the initial request, at least one pulse of the inbound location pulse sequence, and determining the first time delay $(t_{sm}+\Delta t_{d1})$, which is a time difference between sending the initial request and receiving the at least one pulse (e.g., chirp signal); determining an intermediate time delay (delta T), in this case $\Delta t_{d1}$, based on the first time delay, wherein the intermediate time delay comprises an intermediate internal processing delay for the communication device; for at least one iteration: sending a subsequent request (e.g., a subsequent request chirp command) to the communication device on the first data channel; receiving, on the second data channel in response to the subsequent request, at least one subsequent pulse of the inbound location pulse sequence; determining a subsequent time delay $(t_{sm}+\Delta t_d)$ that is a time difference between sending the subsequent request and receiving the at least one subsequent pulse; and determining a subsequent intermediate time delay $(\Delta t_d)$ based on the subsequent time delay, and iteratively repeating previously described steps until a calibrated time delay $(\Delta t_N)$ is reached that comprises the steady state internal processing delay for the communication device.

Figure 3:
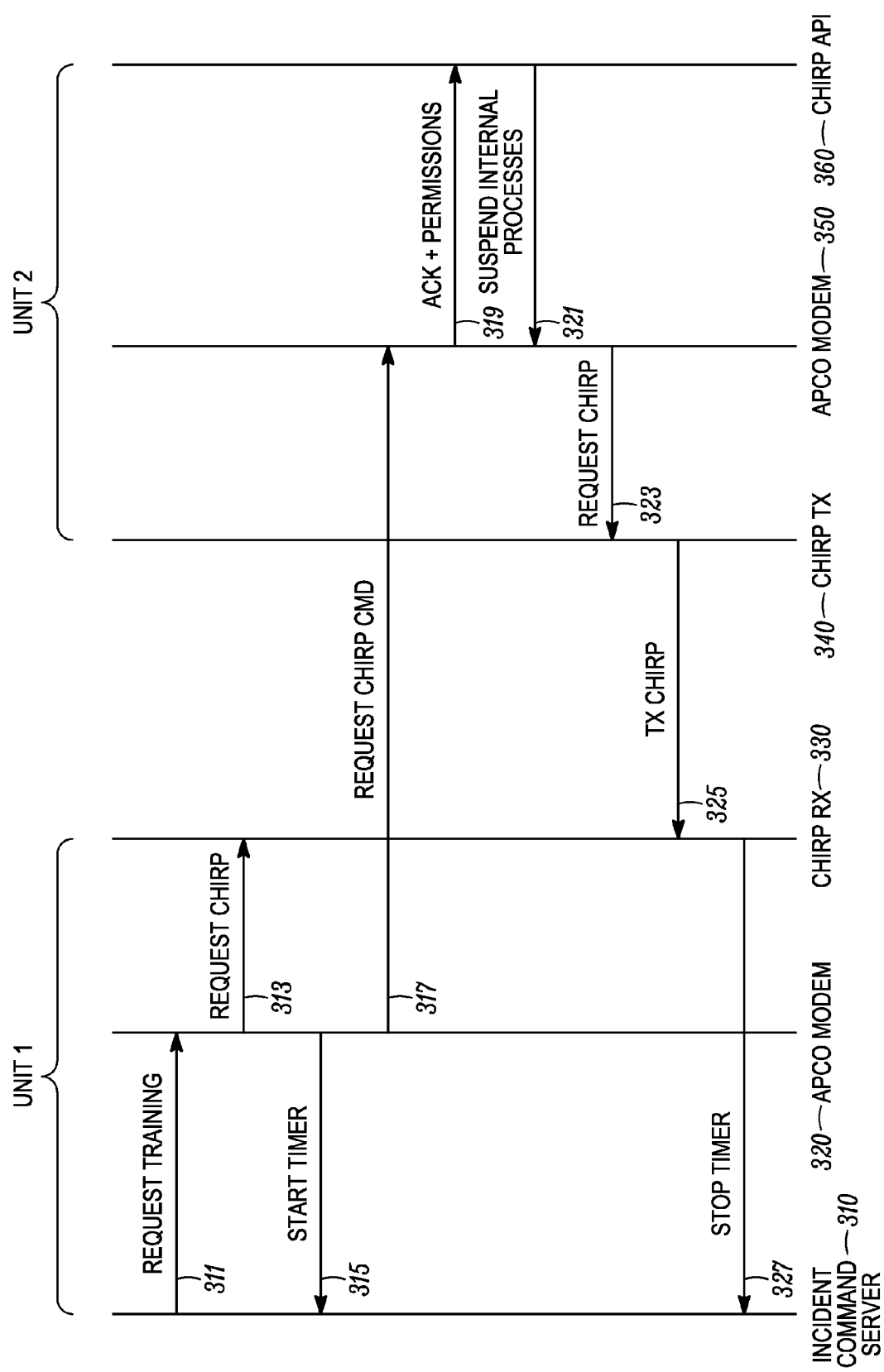
FIG. 3 is a signaling diagram that illustrates initiating a training process in a communication device in accordance with some embodiments.

FIG. 3 shows a signaling diagram that illustrates the reference device 110 initiating the training process. Particularly, FIG. 3 shows the initial procedures during the training process to determine a first time delay $(\Delta t_{d1})$ corresponding to a known distance of the reference device to the communication device. As shown in FIG. 3, the incident command server 310 sends a request training message 311 to the APCO modem 320 to initiate the training process with unit 2. The APCO modem 320 sends a request chirp message 313 to the chirp RX 330 interface to activate/alert the chirp receiver to receive incoming location chirp signals. The APCO modem 320 also sends a start timer message 315 to the incident command server 310 to initiate a timer at the incident command server 310. Simultaneously, APCO modem 320 of the reference device transmits a request chirp command 317 to the APCO modem 350 of the communication device over an APCO25 channel.

In accordance with one embodiment, an APCO25 data packet is transmitted by the reference device that may easily fit in a User Datagram Protocol (UDP) frame. Generally, in an APCO25 data mode, 512 bytes of data with only 480 bytes of useable message or data space are transmitted. Table 1 illustrates some of the key commands, control, or data that may be needed to manage the training and sampling of the ranging chirp signal. Table 1 consists of the control components needed to define the slope (K) of the signal the receiver expects to see. Table 1 also defines how many training pulses to use and the rate. The TX time is sent if available (course ranging) along with pulse shaping information (fine ranging). If the training bit is logic 0, then the incident command server is requesting a sample.

TABLE 1

Location Range Message

| Message | Format |
|---|---|
| Start Freq | Actual or coded |
| Stop Freq | Actual or coded |
| Duration | Actual or coded |
| # pulses | 0 to $2^8$ |
| Burst Rate | 0 to $2^8$ |
| TX time | ns or clocks from RX |
| Shaping data | Actual or Coded |
| Null data | Actual or Coded |
| Weighting | 3-8 bit (none, cosine, $\cos^2$, etc.) |
| Training Bit | 0 = true range, 1 = in training |

After receiving the outbound Request Chirp Command 317 from APCO modem 320, the APCO modem 350 of the communication device sends acknowledgement (ACK) and permissions 319 to the chirp API 360. The chirp API 360 sends a message to suspend all non-critical internal processes, including APCO voice and non-voice processes, to the APCO modem 350 to minimize the internal processing delay. The communication device further activates pre-programmed and predictable timing, functions, and features (such as emergency codes) to manage its internal processing delay, but any suitable technique can be used to manage the internal processes. With its internal processes minimized, the APCO modem 350 sends a request chirp command 323 to chirp TX (transmitter interface) 340 to initiate a chirp sequence. In response to the request chirp message 323, chirp TX 640 selects a slope polarity and magnitude and generates and transmits chirp signals 325 (the inbound location pulse sequence) to the chirp RX 330. In one embodiment, the slope polarity and magnitude indicates to the reference device data associated with the communication device (such as unit ID). In response to receiving the chirp signal, the chirp (RX) sends a stop timer message 327 to the incident command server 310. The incident command server 310 calculates the first time delay ($t_{sm}+\Delta t_{d1}$) by measuring the time difference between starting the timer and stopping the timer message.

Turning momentarily to FIG. 6, which shows a training pulse sequence for training the communication device in accordance with some embodiments. As shown in FIG. 6, an initial request for a location pulse (illustrated as "start pulse" in a series of pulses 610) is transmitted (TX) from the reference device. Each pulse in the sequence 610 may represent a series of requests from the reference device or a single request as illustrated. The communication device transmits the first pulse in a sequence of pulses 620 after receiving the initial request from the reference device. Upon receiving this first pulse, the reference device calculates the first time delay ($t_{sm}+\Delta t_{d1}$). In one embodiment, the start pulse of sequence 610 includes "control" information specific to the communication device generating and preparing the location pulses, for example, a radio identification (ID), the number of location pulses to be transmitted from the communication device, and other control parameters specific to a location pulse such as ramp slope, polarity, and frequency range. It should be noted that FIG. 6 shows the pulses (e.g., requests and responses) in sequences 610 and 620 being evenly spaced in time. However, the teachings herein are not limited to this implementation.

Upon determining the first time delay and prior to continuing the training process, the reference device calculates an intermediate time delay ($\Delta t_{d1}$) based on the first time delay. The intermediate time delay is a measure of the internal processing delays at the communication device at the time that the communication device sent the chirp signal in response to the initial request. To determine a first intermediate time delay $\Delta t_{d1}$, the following parameters in Table 2 should be known at the reference device during training:

TABLE 2

| Parameter | Value |
| --- | --- |
| No. of APCO packets sent by reference device to request location pulse (1 Header and 1 data packet) | 2 |
| APCO data packet length (8 byte Conventional Signaling Block-CSBK) | 20 mS |
| Reference Device Host processor clock frequency | 2000 MHz |
| Reference Device Correlator Processing time delay | 3 mS |
| Distance between Reference & Communication Device when training | 15 meters |
| Speed of Light (meters per Second) | $3 \times 10^8$ |
| Number of host processor clock cycles for a first intermediate time delay | 26 million |

The reference device measures the intermediate time delay relative to the internal clock frequency of the reference device host processor 116. For example, if the reference clock frequency is 2 GHz, then each period of the reference clock period is 0.5 nano-seconds (nS). Each reference clock period corresponds to one clock cycle. Assuming the speed of light is $3 \times 10^8$ meters/second (mps) (environmental effects are assumed negligible), the distance a RF signal will travel in 0.5 nS is 0.15 meters or 0.5 feet (e.g., $3 \times 10^8$ mps $\times 0.5 \times 10^{-9}$ S=0.15 meters). Therefore, by counting the number of host processor clock cycles that elapse between the end of transmission from the reference device of a request for a location pulse to the time the location pulse is received from the communication device, the intermediate time delay $\Delta t_d$ can be calculated. From the above table, if $26 \times 10^6$ clock cycles of the 2 GHz processor clock elapse between the end of transmission to request a location pulse and correlating a corresponding location pulse in response to the request, then $\Delta t_{d1}$ can be said to be 26 million clock cycles long, or 13 milli-seconds (mS). Given that the measurement is performed during training, wherein the distance between the reference device and the communication device is known to be 15 meters, then the RF transient time from the communication device to the reference device should take 50 nS (15 m/$3 \times 10^8$ mps=50 nS) which corresponds to 100 clock cycles (50 uS/0.5 nS/cycle=100 cycles). Because one clock cycle is the minimum achievable resolution in counting an integer number of cycles for $\Delta t_d$, any non-integer clock cycle count is round down to the lowest integer.

The 26 million clock cycles measured for $\Delta t_d$ also includes correlator processing time intrinsic to the reference device. Correlator processing time is the processing time required by the reference device processor 116 to process the location pulse and calculate the matched filter response of the received location signal. The output of the correlator is matched to the specific location pulse characteristics (pulse slope, frequency range, start and stop frequency) and allows the reference device to distinguish a single location pulse from a plurality of different location pulse signals. As is well known in the art, correlators can incorporate varying length digital or analog filtering schemes and may vary in processing time depending on filter length, sample rate, and algorithm complexity. However, as will be apparent to those skilled in the art, the correlator processing time is constant for a given configuration and location pulse characteristic.

For the present example, the correlator processing delay can be 3 ms (refer to table) which would correspond to 6 million clock cycles ($3 \times 10^3$ sec $\times 2 \times 10^9$ cycles/sec=6 million cycles). Finally, the first intermediate time delay of 26 million cycles can be seen to comprise 6 million cycle correlator processing time, 100 cycle RF signal travel time, while the processing delay at the communication device is assigned to the difference of 19.9999 million clock cycles. As the intermediate time delay is reduced due to optimization of communication devices processes, the communication device processing time will also be proportionally reduced; however, the reference device correlator processing time and the RF signal travel time will remain constant.

Figure 4:
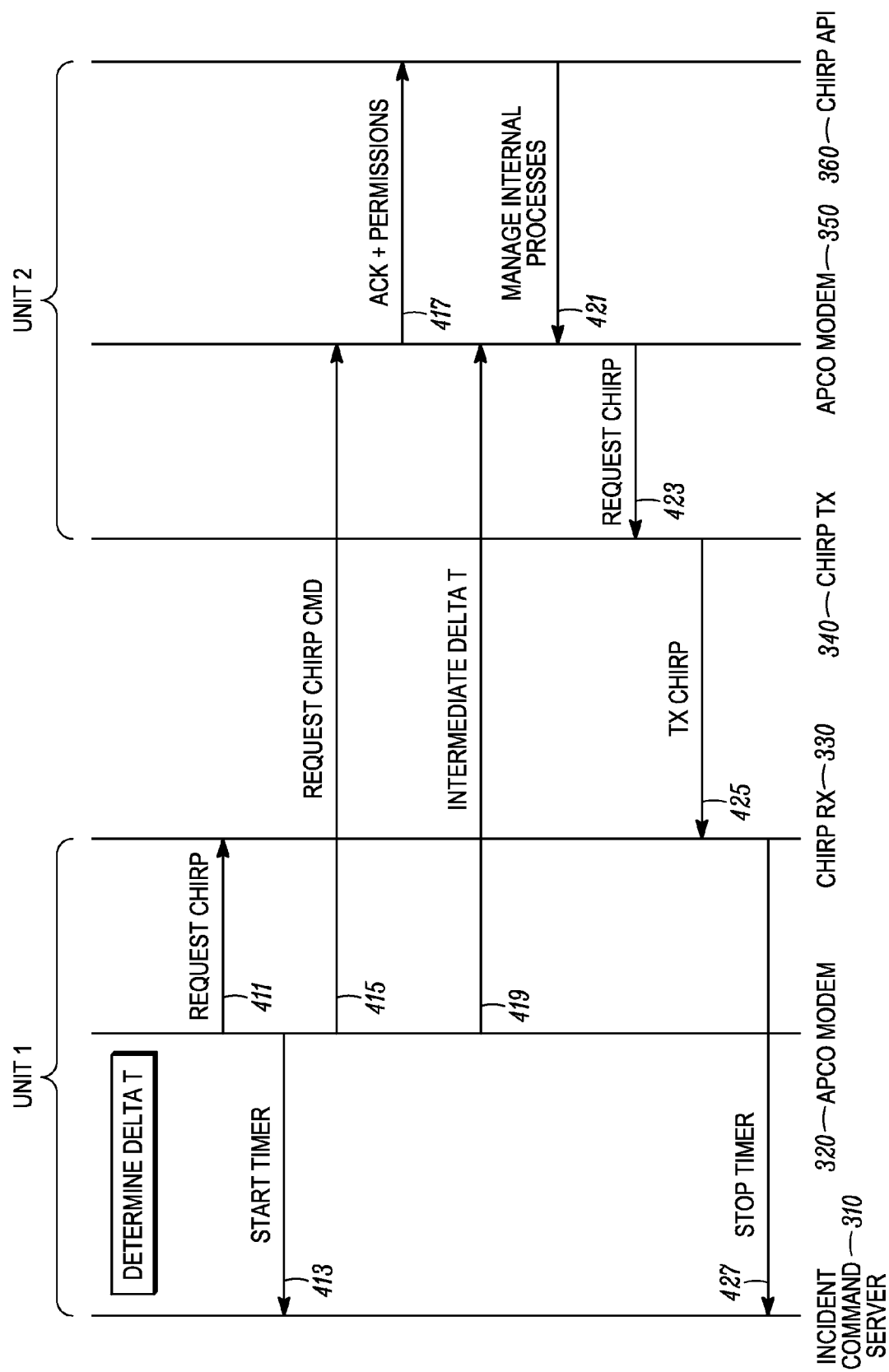
FIG. 4 is a signaling diagram that illustrates continuation of the training process for the communication device in accordance with some embodiments.

Turning next to FIG. 4 in which is illustrated a signaling diagram of the reference device continuing the training process. Herein, the signaling is performed until the calibrated time delay is achieved that comprises the steady state internal processing delay for the communication device. Basically, the reference device iteratively determines a reference time delay and calibrates to this reference time delay (by determining an updated intermediate time delay for the communication device) until the calibrated time delay is reached in the communication device.

To continue with the training process, in accordance with the signaling shown in FIG. 4, the APCO modem 320 sends a request chirp message 411 to the chirp RX 330 to activate/alert the chirp RX to receive incoming chirp signals. The APCO modem 320 also sends a start timer message 413 to the incident command server 310 to initiate a timer at the incident command server 310. Simultaneously, APCO modem 320 of the reference device sends a request chirp command 415 to the APCO modem 350 of the communication device over the APCO25 channel. In accordance with some embodiments, the reference device also sends to the communication device the intermediate time delay ($\Delta t_{d1}$) that it calculated at the start of the training process based on the first time delay. This sending of the intermediate time delay is shown in FIG. 4 as the APCO modem 320 sending an APCO25 message 419 (that includes the intermediate Delta T) over the APCO25 channel to the APCO modem 350. The APCO modem 350 of the communication device sends ACK and permissions 417 to the chirp API 360 in response to receiving the request chirp command 415 from the APCO modem 320. The chirp API 360 sends a message 421 to manage non-critical processes (e.g., voice and maintenance) to the APCO modem 350 to stabilize the internal processing delay.

In accordance with some embodiments, unit 2 fine-tunes and/or disables processes in order to achieve a steady state internal processing delay based on the intermediate time delay ($\Delta t_{d1}$) received from the APCO modem 320. The APCO modem 350 sends a request chirp message 423 to chirp TX 440 to initiate a chirp sequence. In response to the request chirp message 423, chirp TX 340 generates and transmits chirp signals 425 to the chirp RX 330. In response to receiving the chirp signal, the chirp RX 330 sends a stop timer message 427 to the incident command server 310 to stop the timer. The incident command server calculates a reference time delay by measuring the reference time difference between starting the timer and stopping timer. The incident command server uses the time delay to update the intermediate time delay. The signaling of FIG. 4 is repeated until a stable steady state processing delay for the communication device is reached.

During this part of the training process, the reference device determines if the intermediate time delay has converged to a steady state or stable internal processing delay for the communication device. The calibrated time delay is the value of the final intermediate time delay when the intermediate time delay has reached steady state. In one illustrative implementation, the reference device compares a set of contiguous intermediate time delay measurements. When the set of contiguous intermediate time delays are consistently proximate to each other, then the reference device concludes that the communication device has achieved the steady state internal processing delay and associates the last intermediate time delay with the calibrated time delay. However, when the intermediate time delay does not achieve a steady state processing delay, the reference device reiterates the signaling in FIG. 4 to update the intermediate time delay for the communication device. The reference device continues to determine subsequent intermediate time delays until the communication device has reached a steady state internal processing delay.

More particularly, the intermediate time delay is said to have reached steady state when the time difference between consecutive contiguous intermediate time delays is equal to or less than the desired resolution for locating the communication device. From the previous example, given a processing clock frequency of 2 GHz for the reference device host processor 116, it was shown that each cycle of the reference clock correlates to 0.15 meters, or 0.5 feet. Therefore, if the desired resolution for locating the communication device is 2 meters (6.6 feet), then the necessary location accuracy requires that contiguous intermediate time delays be equal to or less than 13 reference clock cycles (2 meters/0.15 meter per clock cycle=13 clock cycles). For the present example, once consecutive intermediate time delays exhibit time periods within 13 clock cycles of each other, the intermediate time delay is said to have reached steady state for the targeted location accuracy.

Thus, training iterations between the reference device and the communication device may continue until the targeted accuracy for locating the communication device is achieved. It will be apparent to those skilled in the art that training durations, defined as the total number of the location pulse iterations required to achieve a steady state intermediate time delay, may be longer to achieve higher accuracy in locating the communication device. Conversely, shorter training durations may be required for less accuracy in locating the communication device. When the reference device determines that the communication device has reached steady state internal processing, the reference device sends a final request for location pulse so that it can confirm and communicate to the communication device the calibrated time delay associated with the steady state internal processing delay of the communication device.

Figure 5:
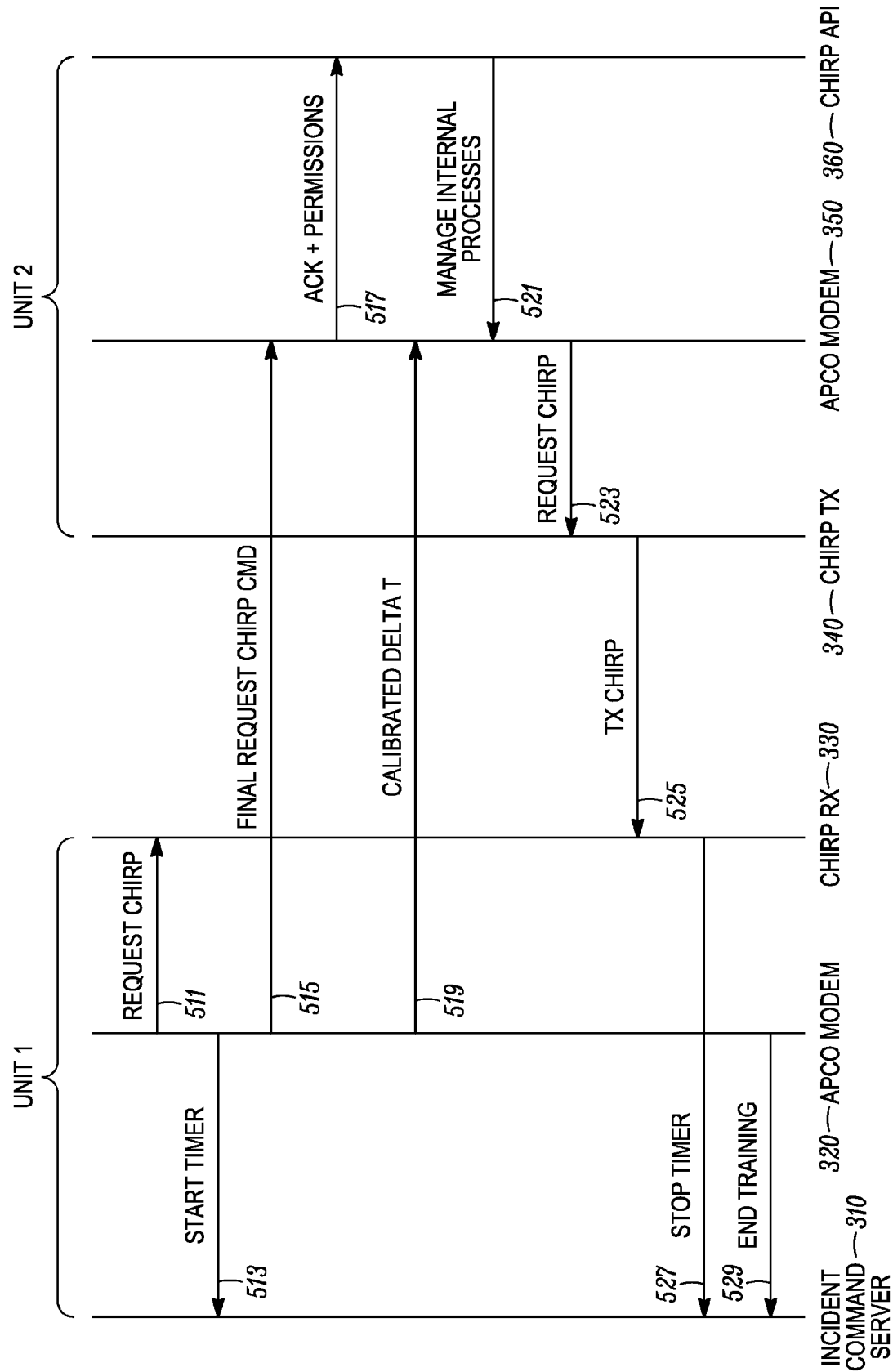
FIG. 5 is a signaling diagram that illustrates terminating the training process in a communication device in accordance with some embodiments.

FIG. 5 is a signaling diagram illustrating the conclusion of a training process and the calculation of the calibrated time delay for a communication device in accordance with some embodiments. As shown in FIG. 5, the APCO modem 320 sends a request chirp message 511 to the chirp RX 330 to activate/alert the chirp RX to receive incoming chirp signals. The APCO modem 320 also sends a start timer message 513 to the incident command server 310 to initiate a timer at the incident command server 310. Simultaneously, APCO modem 320 of the reference device sends a final request chirp command 515 to the APCO modem 350 of the communication device over an APCO25 channel. In accordance with this illustrative implementation, the modem 320 also sends the intermediate time delay ($\Delta t_{dN-1}$), which is associated with the calibrated time delay, in an APCO message 519 to the modem 350 over the APCO channel.

The APCO modem 350 sends ACK and permissions 517 to the chirp API 360 in response to receiving the final request chirp command 515 from the APCO modem 320. The chirp API 360 sends a message 521 to manage internal processes to the APCO modem 650 to stabilize the internal processing delay, wherein the management of the internal processes is aided by the calibrated time delay ($\Delta t_{dN-1}$). The APCO modem 350 sends a request chirp message 523 to chirp TX 340 to initiate a chirp sequence. In response to the request chirp message 523, chirp TX 340 generates and transmits chirp signals 525 to the chirp RX 330. In response to receiving the chirp signal, the chirp RX 330 sends a stop timer message 527 to the incident command server 310 to stop the times. The incident command server calculates a final time delay by measuring the time difference between starting the timer and stopping the timer. The incident command server uses the time delay to verify the calibrated time delay ($\Delta t_{dN}$). After the calibrated time delay is verified, the APCO modem 320 sends an "End Training" acknowledgment to the command server 310.

The calibrated time delay is stored for this communication device at the reference device, the communication device or both. For example, if the calibrated time delay can be associated to a unique location pulse sequence (e.g.: unit ID embedded in location pulse sequence), then the reference device 110 can store the calibrated time delay and the associated communication device identification number in its memory 118. Alternatively, if a common location pulse sequence is used by a plurality of communication devices, the reference devices sends the calibrated time delay time delay to the communication device after training, but prior to deployment for storing in memory 128 for later retrieval by the reference device during a distance computation. The communication device associates the state of its internal processes with the calibrated time delay. In one embodiment, the communication device associates the calibrated time delay to pre-programmed and predictable timing functions at the communication device. Thereafter, the communication device reverts to normal voice/data operation through the interface 121 until a distance computation is to be made by the reference device.

Turning back again to FIG. 6, the reference device sends requests 2 through N (of sequence 610) for location pulses, and in response thereto receives from the communication device chirps 2 through N. Upon receipt of each chirp pulse, the reference device calculates an updated intermediate time delay (e.g., $\Delta t_{d2}$, $\Delta t_{d3}$, $\Delta t_{d4}$, through $\Delta t_{dN-1}$) from the corresponding reference delay times ($t_{sm}+\Delta t_{d2}$, $t_{sm}+\Delta t_{d3}$, $t_{sm}+\Delta t_{d4}$, etc.) and sends the updated time delay to the communication device to further manage its internal processing delays, until the reference device determines that the communication device has reached an internal steady state processing delay, which the reference device associates with the calibrated time delay. Thereafter, the reference device sends the final request for a training pulse (shown as "end train pulse" in FIG. 6). Upon receiving the final chirp signal for the training process, the reference device calculates the calibrated time delay ($\Delta t_{dN}$) from the reference delay time ($t_{sm}+\Delta t_{dN}$).

FIG. 7 illustrates a convergence of calculated time delays associated with the internal processing delay of a communication device, in accordance with some embodiments. As shown in FIG. 7, the time delay (delta time) is plotted on Y-axis and the return sample number (the location pulse or chirp number in the sequence 520) is plotted on the X-axis. The curve 710 shows the time delay for each of the pulses. More particularly, the time delay (delta T) illustrates a plurality of intermediate time delays with initial variation that becomes substantially the same after the seventh $7^{th}$ pulse. Once a steady state time is achieved, a calibrated time delay is measured and associated with a known range measurement. The calibrated time delay is identified as the final delay 915 in curve 910. Although it can take several pulses to train the communication device, at 5K pulses-per-second (pps) the entire training process will be less than a few hundred milliseconds.

FIG. 8 is a signaling diagram which illustrates a method of determining a distance of a communication device from a reference device based on the calibrated time delay, in accordance with some embodiments. As shown in FIG. 8, the incident command server 310 sends a request sample message 811 to the APCO modem 320 to initiate the ranging process of the unit 2. The APCO modem 320 sends a request chirp message 813 to the chirp RX 330 to activate/alert the chirp RX to receive incoming chirp signals. The APCO modem 320 also sends a start timer message 815 to the incident command server 310 to initiate a timer at the incident command server 310. Simultaneously, APCO modem 320 of the reference device transmits a request chirp command 817 to the APCO modem 350 of the communication device over an APCO25 channel to request sample pulses from the communication devices. Generally, the sample pulse is identical to the training pulse with the exception of commands.

The APCO modem 350 of the communication device sends ACK and permissions 819 to the chirp API 360 in response to receiving the request chirp command 817 from the APCO modem 320. The ACK and permissions 819 command also indicates 821 a reconfiguration of all host processing of unit 2 (e.g., by setting pre-programmed and predictable timing functions) to minimize processing delay to achieve equivalence as established and associated with the calibrated time delay. Simultaneously, the APCO modem 350 sends a request chirp message 823 to chirp TX 340 to initiate a chirp sequence. In response to the request chirp message 823, chirp TX 340 generates and transmits chirp signals (sample pulses) 825 to the chirp RX 330. In response to receiving the chirp signal, the chirp RX 330 sends a stop timer message 827 to the incident command server 310 to stop the timer. The incident command server 310 calculates the second time delay by measuring the time difference between starting the timer and stopping the timer.

In accordance with this illustrative implementation, the APCO modem 320 of the reference device requests 829 calibration data stored at the communication device. The calibration data comprises the calibrated time delay. In response to the request 829, the APCO modem 350 of the communication device sends 831 calibrated data to the APCO modem 320 of the reference device. In accordance with alternate embodiments, the calibrated time delay can be stored at the reference device itself. The reference device finally determines the distance (range) of the communication device from the reference device based on the second time delay and the calibrated time delay, for instance by using the earlier described ranging methodologies. The APCO modem 320 sends the end sample message 833 to the incident command server 310 to stop the sampling process.

In accordance with various embodiments, a unified/integrated solution to determine location of a communication device in a variety of situations is provided. Also, the method to determine distance of a communication device from the reference device provides accurate indoor-outdoor location tracking capabilities in emergency situations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as intending that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for determining a distance of a communication device from a reference device, the method comprising:
   the reference device determining a calibrated time delay representative of a steady-state internal processing delay of the communication device by conducting a training process while the communication device is at a known distance from the reference device, the training process comprising transmitting a plurality of location request training signals to the communication device and receiving a corresponding plurality of location response training signals;
   subsequent to conducting the training process, the reference device measuring a second time delay, while the communication device is at a second unknown distance from the reference device, corresponding to a time between the reference device transmitting a location request signal and receiving a location response signal;
   the reference device calculating
   the second unknown distance using the second time delay and the calibrated time delay.

2. The method of claim 1, wherein the training process comprises:
   at the reference device:
      sending an initial request out of the plurality of location request training signals to the communication device on a first data channel to initiate an inbound location pulse sequence out of the plurality of location response training signals;
      receiving, on a second data channel in response to the initial request, at least one pulse of the inbound location pulse sequence, wherein the first time delay is a time difference between sending the initial request and receiving the at least one pulse;
      determining an intermediate time delay based on the first time delay, wherein the intermediate time delay comprises an intermediate internal processing delay for the communication device;
      for at least one iteration:
         sending a subsequent request out of the plurality of location request training signals to the communication device on the first data channel;
         receiving, on the second data channel in response to the subsequent request, at least one subsequent pulse of a subsequent inbound location pulse sequence out of the plurality of location response training signals;
         determining a subsequent time delay that is a time difference between sending the subsequent request and receiving the at least one subsequent pulse; and
         determining a subsequent intermediate time delay based on the subsequent time delay,
      until the calibrated time delay is reached that comprises the steady state internal processing delay for the communication device.

3. The method of claim 2, wherein each internal processing delay for the communication device comprises a delay between the communication device receiving the request from the reference device and the communication device responsively transmitting the corresponding pulse of the inbound location pulse sequence.

4. The method of claim 1, wherein the location request signal is transmitted over a narrowband channel, and the location response signal is received over a wideband channel.

5. The method of claim 1, wherein the location response signal comprises a chirp signals.

6. The method of claim 1, wherein measuring the second time delay comprises, at the reference device:
   sending a request to the communication device on a narrowband channel to transmit an inbound location chirp signal; and
   receiving the inbound location chirp signal on a wideband channel, wherein the second time delay is a time difference between sending the request and receiving the inbound location chirp signal.

7. The method of claim 1, the training process comprising:
   the reference device transmitting a first request out of the plurality of location request training signals to the communication device to transmit a first return signal out of the plurality of location response training signals;

the reference device receiving the first return signal and calculating, using the known distance, a first intermediate time delay representative of a first intermediate internal processing delay of the communication device in processing the first request;

the reference device transmitting a subsequent request out of the plurality of location request training signals to the communication device to transmit a subsequent return signal out of the plurality of location response training signals;

the reference device receiving the subsequent return signal and calculating, using the known distance, a subsequent intermediate time delay representative of a subsequent intermediate internal processing delay of the communication device in processing the subsequent request; and the reference device setting the calibrated time delay equal to the subsequent intermediate internal processing delay.

8. The method of claim 7, further comprising the reference device repeating the steps of transmitting the subsequent request, receiving the subsequent return signal, and calculating the subsequent intermediate internal processing delay until the calculated subsequent intermediate internal processing delay reaches a steady-state value.

9. The method of claim 8 further comprising transmitting, to the communication device, the calibrated time delay that comprises the steady state internal processing delay for the communication device.

10. The method of claim 8, wherein the calculated subsequent intermediate internal processing delay reaches a steady-state value when two consecutive calculations of the subsequent intermediate internal processing delay vary less than a pre-determined threshold amount.

11. The method of claim 10, wherein the pre-determined threshold amount varies based on a desired resolution of the distance determination.

12. The method of claim 10, further comprising transmitting each subsequent intermediate internal processing to the communication device to use in managing its internal processes to reach steady state.

13. The method of claim 12, wherein the communication device suspends at least one voice or non-voice internal process while managing its internal processes in response to receiving the first request and each subsequent request.

14. A method for enabling a distance determination of a communication device from a reference device, the method comprising:

at the communication device, during a training process conducted while the communication device is at a known distance from the reference device:

sending at least one pulse of an initial inbound location pulse sequence in response to an initial request from the reference device;

receiving an intermediate time delay from the reference device representative of a first intermediate internal processing delay of the communication device in processing the first request;

configuring internal processes based on the intermediate time delay to enable the reference device to calculate a calibrated time delay that comprises a steady state internal processing delay for the communication device, and storing the configuration;

receiving and storing the calibrated time delay;

at the communication device, while the communication device is at an unknown second distance from the reference device:

receiving a location request signal from the reference device;

further configuring internal processes in accordance with the stored configuration;

transmitting location response signal to the reference device; and retrieving the calibrated time delay from storage and sending the calibrated time delay to the reference device.

15. The method of claim 14, wherein configuring the internal processes comprises suspending at least one voice or non-voice process at the communication device.

16. The method of claim 14, further comprising associating the calibrated time delay to pre-programmed and predictable timing functions at the communication device.

17. The method of claim 14, wherein the inbound location pulse sequence comprises a plurality of chirp signals.

18. The method of claim 17, further comprising the communication device selecting a slope polarity and magnitude for a chirp signal prior to sending the chirp signal to the reference device.

19. A reference device for determining an unknown distance of a communication device from the reference device, the reference device comprising:

a first radio interface configured to transmit and receive, on a narrowband channel, control information related to an inbound location pulse sequence;

a second radio interface configured to receive, on a wideband channel, the inbound location pulse sequence from the communication device;

a processor; and instructions, contained in data storage, that are executable by the processor for causing the reference device to carry out steps including:

while the communication device is at a known distance from the reference device:

sending, via the first radio interface, a request to the communication device to initiate the inbound location pulse sequence;

receiving, via the second radio interface, at least one pulse of the inbound location pulse sequence from the communication device;

iteratively determining a reference time delay, wherein the reference time delay is a time difference between sending the request and receiving the at least one pulse of the inbound location pulse sequence; and calibrating, to each reference time delay, to determine a calibrated time delay, wherein the calibrated time delay measures a steady state internal processing delay for the communication device; and determining, while the communication device is at the unknown distance from the reference device, the unknown distance using the calibrated time delay and a measured second time delay between the reference device transmitting a location request signal and receiving a location response signal.

20. The apparatus of claim 19, further comprising a timer coupled to the processor and used to measure the reference time delay, the second time delay, and the calibrated time delay.

* * * * *